United States Patent
Ellis et al.

(10) Patent No.: US 6,794,425 B1
(45) Date of Patent: Sep. 21, 2004

(54) PIGMENT PRINTING COMPOSITION

(75) Inventors: Gordon Lee Ellis, Manchester (GB); Paul Francis Mahon, Manchester (GB); Stephen George Yeates, Manchester (GB); Stuart Nicholas Richards, Manchester (GB); Tom Annable, Manchester (GB)

(73) Assignee: Avecia Limited, Manchester (GB)

( * ) Notice: Subject to any disclaimer, the term of this patent is extended or adjusted under 35 U.S.C. 154(b) by 0 days.

(21) Appl. No.: 09/914,212

(22) PCT Filed: Feb. 28, 2000

(86) PCT No.: PCT/GB00/00703

§ 371 (c)(1),
(2), (4) Date: Aug. 23, 2001

(87) PCT Pub. No.: WO00/52106

PCT Pub. Date: Sep. 8, 2000

(30) Foreign Application Priority Data

Mar. 1, 1999 (GB) .............................................. 9904599
Oct. 29, 1999 (GB) .............................................. 9925515

(51) Int. Cl.$^7$ ........................ C09D 11/10; C08L 75/04; C08L 33/02; C08L 33/04; C08L 67/00
(52) U.S. Cl. ...................... 523/160; 524/507; 524/522; 524/523; 524/513; 524/504; 524/505
(58) Field of Search ................................. 523/160, 161; 524/504, 505, 522, 523, 507, 513; 106/31.6

(56) References Cited

U.S. PATENT DOCUMENTS

| | | | | |
|---|---|---|---|---|
| 4,732,613 A | * | 3/1988 | Shioya et al. | 106/31.32 |
| 4,925,885 A | | 5/1990 | Rosthauser et al. | |
| 5,428,088 A | * | 6/1995 | Yamamoto et al. | 524/147 |
| 5,594,044 A | * | 1/1997 | Yang | 523/160 |
| 5,760,124 A | * | 6/1998 | Listigovers et al. | 524/505 |
| 5,803,959 A | * | 9/1998 | Johnson et al. | 106/31.75 |
| 5,851,280 A | * | 12/1998 | Belmont et al. | 106/472 |
| 5,932,629 A | * | 8/1999 | Beck et al. | 523/161 |
| 5,962,571 A | * | 10/1999 | Overbeek et al. | 524/460 |
| 5,976,233 A | * | 11/1999 | Osumi et al. | 106/31.86 |
| 6,005,023 A | * | 12/1999 | Anton et al. | 523/161 |

FOREIGN PATENT DOCUMENTS

| | | |
|---|---|---|
| EP | 0 796 901 | 9/1997 |
| EP | 0 822 238 | 2/1998 |

* cited by examiner

*Primary Examiner*—Callie Shosho
(74) *Attorney, Agent, or Firm*—Pillsbury Winthrop LLP

(57) ABSTRACT

A composition comprising the components: (a) a hydrophilic polymer having a number average molecular weight less than 30,000; (b) a hydrophobic polymer having a number average molecular weight more than 40,000; (c) pigment; and (d) liquid medium, and use of the composition in ink-jet printing.

25 Claims, No Drawings

PIGMENT PRINTING COMPOSITION

This application is the National Phase of International Application PCT/GB00/00703 filed Feb. 28, 2000 which designated the U.S. and that International Application was published under PCT Article 21(2) in English.

The invention relates to compositions containing pigments and to their use in inks for ink-jet printing.

Ink-jet printing involves printing an image onto a substrate using ink droplets ejected through a fine nozzle onto a substrate without bringing the fine nozzle into contact with the substrate.

There are many demanding performance requirements for colorants and inks used in ink-jet printing. For example they desirably provide sharp, non-feathered images having good water-fastness, light-fastness and optical density. The inks are often required to dry quickly when applied to a substrate to prevent smudging, but they should not form a crust which would block the tip of the fine nozzle. The inks should also be stable to storage over time without decomposing or forming a precipitate which could also block the fine nozzle.

Thermal and piezoelectric ink-jet printers are widely used, thus there is a need for inks, suitable for use in both types of printers, having high colour strength and giving images having a high light-fastness and water-fastness when printed on a typical substrate, especially plain paper.

It is known to include aqueous resins emulsions in ink formulations to improve water-fastness of resultant prints. For example EP 0882 771 discloses an aqueous ink-jet recording liquid containing a pigment and a solubilised resin emulsion, and EP 796 901 discloses an aqueous pigment ink jet-recording liquid containing an aqueous dispersion resin consisting of a core/shell acrylic polymer.

It has now been found that combinations of a pigment with a low molecular weight hydrophilic polymer and a high molecular weight hydrophobic polymer in a liquid medium results in a composition which is suitable as an ink for use in thermal and piezo ink-jet printers, shows stability over a range of conditions and the resultant prints show improved water-fastness, light-fastness, optical density and smear resistance over the use of a single resin component.

Thus, according to the present invention there is provided a composition comprising the components:

(a) a hydrophilic polymer having a number average molecular weight less than 30,000;

(b) a hydrophobic polymer having a number average molecular weight more than 40,000;

(c) pigment; and (d) liquid medium.

The number average molecular weight (Mn) for components (a) and (b) may be measured by any of the well known techniques, preferably by gel permeation chromatography ("gpc"). The gpc method used for determining Mn preferably comprises applying the polymer to a chromatography column packed with cross-linked polystyrene/divinyl benzene, eluting the column with tetrahydrofuran at a temperature of 400° C. and assessing the Mn of the polymer compared to a number of a polystyrene standards of a known Mn. Suitable cross-linked polystyrene/divinyl benzene chromatography columns are commercially available from Polymer Laboratories.

As an alternative to the gpc method for determining Mn one may use other methods, for example multi-angle light scattering.

Preferably the Mn of component (a) is less than 20,000, more preferably less than 12,500 and especially less than 10,000. Preferably the Mn of component (a) is more than 500. Preferably the Mn of component (b) is more than 60,000 more preferably more than 70,000. Preferably the Mn of component (b) is less than 10 million, more preferably less than 2 million.

The hydrophilic and hydrophobic polymers may each independently be homopolymers or copolymers. Preferably the hydrophilic and hydrophobic polymers are copolymers.

Component (a) is preferably hydrophilic by virtue of the presence of ionic and/or non-ionic water dispersing groups in the hydrophilic polymer. The hydrophilic polymer is preferably prepared by polymerising one or more monomers having water-dispersing groups, optionally with one or more monomers which are free from water-dispersing groups. The nature and level of water-dispersing groups in the polymer influences whether a solution, dispersion, emulsion or suspension is formed on dissipation of the hydrophilic polymer in aqueous media. Preferably the level of monomers having water-dispersing groups is from 5 to 80% by weight of the hydrophilic polymer. Preferably the level of monomers having water-dispersing groups is at least 5% by weight greater in the hydrophilic polymer than the level of monomers having water-dispersing groups in the hydrophobic polymer. For example, if the level of monomers having water-dispersing groups is 5% by weight of the hydrophobic polymer then the level of monomers having water-dispersing groups in the hydrophilic polymer is preferably at least 10% by weight of the hydrophilic polymer. More preferably the level of monomers having water-dispersing groups is at least 10% by weight greater in the hydrophilic polymer than the level of monomers having water-dispersing groups in the hydrophobic polymer. Preferably a solution is formed on dissipation of the hydrophilic polymer in water, although a minor amount of the hydrophilic polymer may be insoluble in water and exist as dissipated particles when mixed with aqueous media or water.

Water-dispersing groups are preferably pendant to the main polymer backbone. Preferred ionic water-dispersing groups are anionic water-dispersing groups, especially carboxylic, phosphonic and or sulphonic acid groups. Preferred non-ionic water-dispersing groups are polyoxyalkylene groups, more preferably polyoxyethylene groups.

A small segment of the polyoxyethylene group can be replaced by a oxypropylene segment and/or oxybutylene segment, however the polyoxyethylene group should still contain oxyethylene as a major component. When the water-dispersing groups in the hydrophilic polymer are predominantly polyoxyethylene groups, the polyoxyethylene group content preferably does not exceed 25% by weight, more preferably does not exceed 15% by weight, based on the total weight of the hydrophilic polymer.

The anionic water-dispersing groups are preferably fully or partially in the form of a salt. Conversion to the salt form is optionally effected by neutralisation of the polymer with a base, preferably during the preparation of the hydrophilic polymer and/or during the preparation of the composition of the present invention. If anionic water-dispersing groups are used in combination with a non-ionic water-dispersing group, neutralisation may not be required.

Preferably the base used to neutralise any anionic water-dispersing groups is ammonia, an amine or an inorganic base. Suitable amines include tertiary amines, for example triethylamine or triethanolamine. Suitable inorganic bases include alkaline hydroxides and carbonates, for example lithium hydroxide, sodium hydroxide, or potassium hydroxide. A quaternary ammonium hydroxide, for example $N^+(CH_3)_4OH^-$, can also be used. Generally a base is used which gives the required counter ion desired for the composition. For example, preferred counter ions include $Li^+$, $Na^+$, $K^+$, $NH_4^+$ and substituted ammonium salts.

Component (a) is preferably a hydrophilic acrylic, polyurethane or polyester polymer, more preferably a hydrophilic acrylic or polyurethane polymer, especially a hydrophilic polyurethane polymer.

When component (a) is a hydrophilic acrylic polymer it preferably has a glass transition temperature (Tg) greater than −10° C. and more preferably from 20° C. to 120° C. Tg is the temperature at which the polymer changes from a glassy, brittle state to a plastic, rubbery state, and may be measured by differential scanning calorimetry.

When component (a) is a hydrophilic acrylic polymer it preferably has an acid value from 30 to 200 mgKOH/g, more preferably from 30 to 150 mgKOH/g and especially from 40 to 100 mgKOH/g.

The hydrophilic acrylic polymer has preferably been obtained from the polymerisation of one or more olefinically unsaturated monomers having ionic and/or non-ionic water-dispersing groups, optionally in the presence of one or more olefinically unsaturated monomers which are free from ionic and non-ionic water-dispersing groups.

Preferred olefinically unsaturated monomers having ionic water-dispersing groups include but are not limited to acrylic acid, methacrylic acid, itaconic acid, β-carboxy ethyl acrylate, maleic acid, monoalkyl itaconates (for example, monomethyl maleate, monoethyl maleate, monobutyl maleate and monooctyl maleate), citraconic acid, styrenesulfonic acid, vinylbenzylsulfonic acid, vinylsulfonic acid, acryloyloxyalkyl sulfonic acids (for example, acryloyloxymethyl sulfonic acid, acryloyloxyethyl sulfonic acid, acryloyloxypropyl sulfonic acid and acryloyloxybutyl sulfonic acid), methacryloyloxymethyl sulfonic acid, methacryloyloxyethyl sulfonic acid, methacryloyloxypropyl sulfonic acid and methacryloyloxybutyl sulfonic acid), 2-acrylamido-2-alkylalkane sulfonic acids (for example, 2-acrylamido-2-methylethanesulfonic acid, 2-acrylamido-2-methylpropanesulfonic acid and 2-acrylamido-2-methylbutane sulfonic acid), 2-methacrylamido-2-alkylalkane sulfonic acids (for example, 2-methacrylamido-2-methylethanesulfonic acid, 2-methacrylamido-2-methylpropanesulfonic acid and 2-methacrylamido-2-methylbutanesulfonic acid), mono-(acryloyloxyalkyl) phosphates (for example, mono(acryloyloxyethyl)phosphate and mono(3-acryloyloxypropyl)phosphates) and mono (methacryloyloxyalkyl)phosphates (for example, mono (methacryloyloxyethyl)phosphate and mono(3-methacryloyloxypropyl)phosphate).

Especially preferred olefinically unsaturated monomers having ionic water-dispersing groups include acrylic acid, methacrylic acid, itaconic acid, β-carboxy ethyl acrylate, and/or maleic acid.

Preferred olefinically unsaturated monomers having non-ionic water-dispersing groups include alkoxy polyethylene glycol (meth)acrylates, preferably having a Mn of from 350 to 2000. Examples of such monomers which are commercially available include Ω-methoxypolyethylene glycol acrylate.

Preferred olefinically unsaturated monomers which are free from ionic or non-ionic water-dispersing groups include alkyl(meth)acrylates, optionally substituted styrenes, methacrylamides, pyrrolidones, and allyl compounds.

Preferred alkyl(meth)acrylates contain less than twenty carbon atoms. Examples include methyl acrylate, ethyl acrylate, n-propyl acrylate, isopropyl acrylate, n-butyl acrylate, isobutyl acrylate, sec-butyl acrylate, amyl acrylate, hexyl acrylate, 2-ethylhexyl acrylate, octyl acrylate, tert-octyl acrylate, 2-phenoxyethyl acrylate, 2-chloroethyl acrylate, 2-bromoethyl acrylate, 4-chlorobutyl acrylate, cyanoethyl acrylate, 2-acetoxyethyl acrylate, dimethylaminoethyl acrylate, benzyl acrylate, methoxybenzyl acrylate, 2-chlorocyclohexyl acrylate, acylate, acetoacetate, cyclohexyl acylate, furfuryl acrylate, tetrahydrofurfuryl acrylate, phenyl acrylate, 5-hydroxypentyl acrylate, 2,2-dimethyl-3-hydoxypropyl acrylate, 2-methoxyethyl acrylate, 3-methoxybutyl acrylate, 2-ethoxyethyl acrylate, 2-isopropoxyethyl acrylate, 2-butyoxyethyl acrylate, 2-(2-methoxyethoxy)ethyl acrylate, 2-(2-butoxyethoxy)ethyl acrylate, 1-bromo-2-methoxyethyl acrylate, 1,1-dichloro-2-ethoxyethyl acrylate, methyl methacrylate, ethyl methacrylate, hydroxyethyl methacrylate, n-propyl methacrylate, isopropyl methacrylate, n-butyl methacrylate, isobutyl methacrylate, sec-butyl methacrylate, amyl methacrylate, hexyl methacrylate, cydohexyl methacrylate, benzylmethacrylate, chlorobenzyl methacrylate, octyl methacrylate, N-ethyl-N-phenylaminoethyl methacrylate, 2-(3phenylpropyloxy)ethyl methacrylate, dimethylaminophenoxyethyl methacrylate and furfuryl methacrylate. Aromatic examples include but are not limited to 4-alkyl phenylacrylate or methacrylate, phenyl methacrylate, phenyl acrylate, and β-napthyl methacrylate, Preferred optionally substituted styrenes include styrene, methylstyrene, dimethylstyrene, trimethylstyrene, ethylstyrene, diethylstyrene, isopropylstyrene, butylstyrene, hexylstyrene, cyclohexylstyrene, decylstyrene, chloromethylstyrene, trifluoromethylstyrene, ethoxymethylstyrene, acetoxymethylstyrene, methoxystyrene, 4-methoxy-3-methylstyrene, dimethoxystyrene, chlorostyrene, dichlorostyrene, trichlorostyrene, tetrachlorostyrene, pentachlorostyrene, bromostyrene, dibromostyrene, iodostyrene, trifluorostyrene and 2-bromo-4-tri-fluoromethylstyrene.

Preferred methacrylamides contain less than 12 carbon atoms. Examples include methylmethacrylamide, tert-butylmethacrylamide, tert-octylmethacrylamide, benzylmethacrylamide, cyclohexylmethacrylamide, phenylmethacrylamide, dimethylmethacrylamide, dipropylmethacrylamide, hydroxyethyl-N-methylmethacrylamide, N-methylphenylmethacrylamide, N-ethyl-N-phenylmethacrylamide and methacrylhydrazine.

Preferred allyl compounds include allyl acetate, allyl caprylate, allyl laurate, allyl palmitate, allyl stearate, allyl benzoate, allyl acetoacetate, allyl lactate, allyloxyethanol, allyl butyl ether and allyl phenyl ether.

The hydrophilic acrylic polymer may be prepared in a conventional manner by polymerising the olefinically unsaturated monomers having -ionic and/or non-ionic water-dispersing groups, optionally in the presence of olefinically unsaturated monomers which are free from ionic and non-ionic waterdispersing groups. Temperatures from 20° C. to 180° C. are preferred. The polymerlsation may be continued until reaction between the monomers is complete or the desired Mn has been reached.

Preferred polymerisation methods include solution polymerisation, emulsion polymerisation, suspension polymerisation and solution/dispersion polymerisation and such general methods as are well known in the art.

If desired, an initiator may be used to assist acrylic polymer formation. Suitable initiators include free-radical generators. Examples of initiators include azobis compounds, peroxides, hydroperoxides, redox catalysts, potassium persulfate, ammonium persulfate, tert-butyl peroctoate, benzoyl peroxide, isopropyl percarbonate, 2,4-dichlorobenzoyl peroxide, methyl ethyl ketone peroxide, cumene hydroperoxide, dicumyl peroxide, azobisisobutyronitrile, azobis(2amidino-propane) hydrochloride and the like. Typically 0.05 to 5% by weight of initiator is used relative to the total weight of the monomers. Preferably the polymerisation is performed in the presence of an emulsifying agent.

Optionally the hydrophilic acrylic polymer is prepared by a process in which the Mn is controlled by the addition of chain transfer agents and/or through the adjustment of the ratio of the concentration of monomers relative to the concentration of initiator during the course of the polymerisation. Typical chain transfer agents are thiols, halocarbons and cobalt macrocycles.

When component (a) is a hydrophilic polyurethane the Mn is preferably less than 12,500, more preferably less than 10,000, especially less than 7,500 and more especially less than 5,000. When component (a) is a hydrophilic polyurethane the Mn is preferably more than 500. Preferred hydrophilic polyurethanes are linear.

The hydrophilic polyurethane is preferably obtained from the reaction of at least one organic polyisocyanate and at least one isocyanate-reactive compound having ionic and/or non-ionic water-dispersing groups, optionally in the presence of isocyanate-reactive compounds which are free from ionic and non-ionic water-dispersing groups.

The organic polyisocyanate may be any known in the art, preferably having two isocyanate groups, and may for example be an aliphatic, cycloaliphatic, aromatic or araliphatic isocyanate. Examples of suitable organic polyisocyanates include ethylene diisocyanate, 1,6-hexamethylene diisocyanate, isophorone diisocyanate, tetramethylxylene diisocyanate, 1,4-phenylene diisocyanate, 2,4-toluene diisocyanate, 2,6-toluene diisocyanate, 4,4'-diphenyl-methane diisocyanate and its hydrogenated derivative, 2,4'-diphenylmethane diisocyanate and its hydrogenated derivative, and 1,5-naphthylene diisocyanate. Mixtures of the polyisocyanates can be used, particularly isomeric mixtures of the toluene diisocyanates or isomeric mixtures of the diphenylmethane diisocyanates (or their hydrogenated derivatives), and also organic polyisocyanates which have been modified by the introduction of urethane, allophanate, urea, biuret, carbodiimide, uretonimine or isocyanurate residues.

Preferred organic polyisocyanates include cycloaliphatic polyisocyanates, especially isophorone diisocyanate, and aliphatic isocyanates, especially 1,6-hexamethylene diisocyanate or hydrogenated 4,4-diphenyl methyl diisocyanate.

The isocyanate-reactive compound preferably has at least one, more preferably two, isocyanate-reactive groups. Optionally isocyanate-reactive compounds having three isocyanate-reactive groups may be present, preferably in low levels not exceeding 5% by weight relative to the total weight of the isocyanate-reactive compound. Preferred isocyanate-reactive groups are selected from —OH, —NH$_2$, —NH— and —SH. These isocyanate-reactive groups are capable of reacting with an isocyanate (-NCO) group.

Preferred isocyanate-reactive compounds having water-dispersing groups include low molecular weight polyols or polyamines bearing ionic and/or non-ionic water-dispersing groups. Preferred isocyanate-reactive compounds having anionic water-dispersing groups are diols having one or more sulphonic acid groups and/or carboxylic acid groups, more preferably dihydroxy alkanoic acids, especially 2,2-dimethylol propionic acid. Preferred isocyanate-reactive compounds having non-ionic water-dispersing groups are diols providing polyoxyethylene groups.

Preferred isocyanate-reactive compounds which are free from ionic arid non-ionic water-dispersing groups include organic polyol(s) and/or polyamine(s). Preferred organic polyols or polyamines have a Mn up to 3000, more preferably up to 2000, especially from 400 to 2000. Preferred organic polyols are diols. The diols include members of any of the chemical classes of diols used or proposed to be used in polyurethane formulations. In particular, the diols are preferably polyesters, polyesteramides, polyethers (other than ones providing polyoxyethylene groups), polythioethers, polycarbonates, polyacetals, polyolefins or polysiloxanes. Further examples of optional diols which are free from ionic and non-ionic water-dispersing groups include organic diols having an Mn below 400. Examples of such diols include ethylene glycol, diethylene glycol, tetraethylene glycol, bis(hydroxyethyl)terephthalate, cyclohexane dimethanol, and furan dimethanol.

The hydrophilic polyurethane may be prepared in a conventional manner by reacting one or more organic polyisocyanates with one or more isocyanate-reactive compounds. Substantially anhydrous conditions are preferred. Temperatures of from 30° C. to 130° C. are preferred and the reaction is preferably continued until the reaction between the organic polyisocyanates and the isocyanate-reactive compounds is substantially complete.

The relative amounts of the organic polyisocyanate and the isocyanate-reactive compounds are preferably selected such that the mole ratio of isocyanate groups to isocyanate-reactive groups is about 2:1 to 1:2, preferably from about 1.4:1 to 1:1.4. Alternatively an isocyanate-group terminated polyurethane prepolymer may be prepared in a two stage process either in solvent or as a melt, wherein the ratio of isocyanate groups to isocyanate-reactive groups is from about 1.1:1 to 2:1, preferably from about 1.1:1 to 1.9:1.

Terminating compounds, for example compounds having one isocyanante group or one isocyanate-reactive group, may be used to cap-off any excess isocyanate or isocyanate-reactive end groups in the polyurethane resulting from the reaction of the organic polyisocyanate and isocyanate-reactive compound. Compounds having one isocyanate-reactive group include, for example, monoalcohols, monoamines and monothiols, especially isopropanol. Compounds having one isocyanate reactive group include alkyl monoisocyanates. The Mn of the polyurethane may be controlled through the use of such terminating compounds. The terminating compounds may also bear ionic and/or non-ionic water-dispersing groups, for example the groups hereinbefore described.

If desired a catalyst may be used to assist formation of the hydrophilic polyurethane. Suitable catalysts include di-butyl tin dilaurate, stannous octoate and tertiary amines as known in the art.

Preferably the hydrophilic polyurethane is not prepared by chain-extension of an isocyanate-terminated polyurethane prepolymer (for example by mixing the hydrophilic polyurethane with water or water mixed with chain-extenders).

When component (a) is a hydrophilic polyester polymer, the Mn is preferably in the range from more than 500 to less than 30,000, more preferably in the range from 1000 to 25,000.

The Tg of the hydrophilic polyester is preferably in the range of from −38° C. to 105° C.

The hydrophilic polyester is preferably obtained by polymerising at least one monomer having two or more functional groups which will readily undergo an ester condensation reaction and having ionic and/or non-ionic water-dispersing groups, optionally in the presence of monomers having two or more functional groups which will readily undergo an ester condensation reaction which are free from ionic and non-ionic water-dispersing groups. Preferred anionic water-dispersing groups are as mentioned above, especially sulphonic acid groups, ionised sulphonate groups and carboxylic acid groups and ionised carboxyl groups.

Functional groups which will readily undergo an ester condensation reaction include carboxyl groups, hydroxyl groups and esterifiable derivatives thereof. Examples of such monomers are aromatic dicarboxylic acids having an ionised sulphonate group. Particularly preferred is sodio-5-sulphoisophthalic acid (SSIPA).

Other useful monomers which have two or more groups which readily undergo an ester condensation reaction and have one or more sulphonate groups are dihydroxy aryl monomers having at least one sulphonate group.

The amount of water-dispersing groups, for example ionised sulphonate and/or carboxy and/or non-ionic water-dispersing groups, present in the hydrophilic polyester is preferably sufficient to provide water-dissipatability of the polyester ionised sulphonate groups are more effective at providing or contributing to water-dissipatability than ionised carboxy groups and so can be used at considerably lower levels in comparison to ionised carboxy groups.

When the hydrophilic polyester mainly contains SSIPA as the monomer for providing the ionised sulphonate groups, the amount of this monomer used in the polyester synthesis, based on the weight of all the monomers used in the polyester synthesis, will usually be within the range from 5 to 20% by weight. The acid value of the hydrophilic polyester which contains mainly ionised sulphonate groups will generally be within the range of from 0 to 100 mgKOH/g, more preferably 0 to 50 mgKOH/g, especially 0 to 25 mgKOH/g, more especially 0 to 10 mgKOH/g.

When the hydrophilic polyester predominantly contains ionised carboxy water-dispersing groups, the acid value of the polyester is preferably within the range of from 20 to 140 mgKOH/g more preferably 30 to 100 mgKOH/g.

Monomers having two or more functional groups which will readily undergo an ester condensation reaction and having non-ionic water-dispersing groups include mono-, di- or higher functional hydroxy compounds containing polyoxyethylene groups, for example polyethylene glycols and alkyl ethers of polyethylene glycols.

Monomers having two or more functional groups which will readily undergo an ester condensation reaction and are free from ionic and non-ionic water-dispersing groups include polybasic carboxylic acids and polyols in which the carboxylic acid groups and hydroxy groups are esterified during the polymerisation process. For example, aliphatic, alicyclic and aromatic compounds having two or more carboxy groups and their ester forming derivatives (e.g. esters, anhydrides and acid chlorides) may be used. Specific examples include adipic acid, fumaric acid, maleic acid, succinic acid, itaconic acid, sebacic acid, nonanedioic acid, decanedioic acid, 1,4-cyclohexanedicarboxylic acid, 1,3-cyclohexanedicarboxylic acid, 1,2-cyclohexanedicarboxylic acid, terephthalic acid, isophthalic acid, phthalic acid and tetrahydrophthalic acid and their acid chlorides. Anhydrides include succinic, maleic, phthalic and hexahydrophthalic anhydrides.

Preferred polyols which can be used to form the polyester include those having from 2 to 6, more preferably 2 to 4 and especially 2 hydroxyl groups per molecule. Suitable polyols having two hydroxy groups per molecule include diols such as 1,2-ethanediol, 1,3-propanediol, 1,4-butanediol, 1,6-hexanediol, 2,2dimethyl-1,3-propanediol (neopentyl glycol), the 1,2-, 1,3- and 1,4-cyclohexanediols and the corresponding cyclohexane dimethanols, diethylene glycol, dipropylene glycol, and diols such as alkoxylated bisphenol-A products, e.g. ethoxylated or propoxylated bisphenol A. Suitable polyols having three hydroxy groups per molecule include triols such as trimethylolpropane(1,1,1-tris(hydroxymethyl)ethane). Suitable polyols having four or more hydroxy groups per molecule include pentaerythritol(2,2-bis(hydroxymethyl)-1,3-propanediol) and sorbitol(1,2,3,4,5,6-hexahydroxyhexane).

Preferably component (b) readily disperses in component (d). On dispersion the particle size of component (b) is preferably such that when present in the composition it has a particle size from 20 to 500nm, more preferably from 20 to 350nm, especially from 20 to 200 nm. Particle size can be measured by, for example, laser light scattering electron microscopy.

Component (b) is preferably an hydrophobic acrylic or polyurethane polymer of Mn more than 40,000. The hydrophobic polymer is preferably prepared by the methods described above for the hydrophillic polymers, except that the ionic and non-ionic water-dispersing groups are omitted or are present in low amounts. Component (b) is preferably hydrophobic by virtue of being free from or having low levels of ionic and/or non-ionic water-dispersing groups. The hydrophobic polymer is preferably prepared by polymerising one or more monomers which are free from or having low levels of ionic and/or non-ionic water-dispersing groups. The level of monomers having water-dispersing groups is preferably from 0 to 25% by weight of the hydrophobic polymer. Although the hydrophobic polymer has only a low solubility in pure water, it is preferably chosen such that it does not precipitate out when in the composition of the invention.

When component (b) is a hydrophobic acrylic polymer the preferred acid value is from 0 to 30 mgKOH/g.

The Tg of the hydrophobic acrylic polymer is preferably in the range of from −10° C. to 120° C., more preferably in the range of from 20° C. to 110° C. most preferably in the range of from 40° C. to 110° C.

Preferably the hydrophobic acrylic polymer is a copolymer comprising styrene.

When component (b) is a hydrophobic polyurethane polymer, the hydrophobic polyurethane polymer can optionally be prepared by chain extending an isocyanate terminated polyurethane prepolymer, using techniques well known in the art. Suitable chain extenders include polyols, amine alcohols, diamines, hydrazines, substituted hydrazines and water. When the chain extender is other than water, for example a diamine, it may be added to an aqueous dispersion of the polyurethane prepolymer or may already be present in the aqueous medium when the polyurethane prepolymer is dispersed therein. The hydrophobic polyurethane polymer may be linear, branched or crosslinked.

Component (a) and component (b) are optionally based on the same or different polymers. For example component (a) may be a hydrophilic polyurethane and component (b) a hydrophobic polyurethane or component (a) may be a hydrophilic polyurethane and component (b) may be a hydrophobic acrylic polymer, in each case having the Mn as specified above.

Components (a) and (b) optionally each comprise a mixture of polymers. For example component (a) may comprise a mixture of hydrophilic acrylic polymers or a mixture of a hydrophilic acrylic polymer and a hydrophilic polyurethane polymer.

In a preferred embodiment the polymers used as component (a) and component (b) in the composition of the invention are each independently selected from acrylic polymers and polyurethane polymers.

Components (a) and (b) are purified if desired in the usual way for colorants used in ink-jet printing inks, for example by ion-exchange, filtration, reverse osmosis, dialysis, ultra-filtration or a combination thereof. In this way one may remove co-solvents used for the polymerisation, low molecular weight salts, impurities and free monomers.

Components (a) and (b) can be combined in a number of ways. For example, components (a) and (b) can be prepared separately, followed by combination by blending. The blending may be performed at any stage, for example before components (a) and (b) are added to the liquid medium, or components (a) and (b) may be incorporated individually into the liquid medium and then blended. Alternatively, when component (a) is an acrylic polymer, components (a) and (b) can be combined by preparing component (b) by in-situ aqueous emulsion in the presence of component (a). When component (b) is an acrylic polymer, components (a) and (b) can be combined by preparing component (a) by an in-situ aqueous emulsion polymerisation in the presence of component (b). Preferably when components (a) and (b) are both acrylic polymers, components (a) and (b) are prepared separately, followed by combination by blending. When components (a) and (b) are both acrylic polymers and component (b) is prepared in the presence of component (a) then the Tg of component (b) is preferably greater than 40° C., more preferably greater than 45° C., most preferably greater than 50° C.

For example when component (b) is a hydrophobic acrylic polymer, the hydrophobic acrylic polymer may be prepared by aqueous polymerisation using component (a) (hydrophilic acrylic, polyurethane and/or polyester polymer) as a polymeric dispersant. Optionally additional surfactant may be used to aid dispersion. Preferably the aqueous polymerisation is carried out at a pH above 7.

Alternatively when component (b) is a hydrophobic acrylic polymer the hydrophobic acrylic polymer may be prepared by emulsion polymerisation at a low pH followed by in-situ polymerisation of a hydrophilic acrylic polymer component (a) at a low pH, with subsequent neutralisation with a base to pH 7.

The weight ratio of component (a) to component (b) is preferably from 5:95 to 99:1, more preferably from 5:95 to 95:5, especially from 5:95 to 50:50, more especially from 5:95 to 40:60, most especially of from 10:90 to 40:60.

In a preferred embodiment the weight ratio of component (a) to component (b) is from 99:1 to 90:50, preferably from 99:1 to 60:40, more preferably 99:5 to 60:40. This embodiment is preferred because compositions containing these ratios of components (a) to (b) perform particularly well in thermal ink-jet printers. Inks prepared from these compositions are stable, and prints prepared using the inks give a good performance in terms of wet rubfastness, light-fastness and highlighter smear resistance.

The pigment (component (c)) is preferably a water-insoluble colorant, preferably inorganic or organic. Preferred inorganic pigments include carbon black, titanium dioxide, zinc oxide, zirconium oxide, chromium oxide, iron oxide and combinations thereof.

Preferred organic pigments include phthalocyanine, anthraquinone, perinone, indigoid, perylene, azo, carbon black pigments carrying ionic groups, azomethine, condensed ring pigments and pigments as mentioned in the Colour Index International, Third Edition (1982) Pigments and Solvent dyes, pages 10 to 143, which are incorporated herein by reference thereto. Preferred organic pigments are yellows, reds, oranges, violets, blue and/or black. In particular it has been found that when using a coloured pigment the light-fastness of prints prepared using the inks is greatly improved. This improvement is particularly noticeable with coloured inorganic and/or organic pigments other than black pigments, for example yellow, red, orange, green, violet, indigo and blue pigments which tend to have lower light-fastness than black pigments.

The carbon black pigment optionally carries water-dispersing groups, especially ionic groups, for example anionic and/or cationic groups. The anionic groups preferably comprise a carboxylic, sulphonic or phosphonic acid group. The cationic groups preferably comprise a quaternary ammonium group. Carbon black pigments carrying ionic groups are commercially available from a number of sources, including Mitsubishi and Cabot corporation for example the Cabojet (Cabojet is a Trade Mark of Cabot) range of carbon black pigments. Particularly preferred is carbon black pigment having a mean particle size of from 5 to 100 nm, more preferably of from 10 to 30 nm. The carbon black pigment preferably has a pH of from 3 to 9.

The pigment used in the composition of the present invention is optionally a mixture comprising of two or more pigments. Pigments are present in any effective amount in the composition, typically from about 1 to about 10 percent by weight of the composition.

The liquid medium (component (d)) preferably comprises water and an organic solvent. The organic solvent preferably comprises a water-miscible organic solvent and/or a water-immiscible organic solvent.

Suitable water-miscible organic solvents include methanol, ethanol, n-propanol, isopropanol, n-butanol, sec-butanol, tert-butanol, isobutanol, dimethylformamide, dimethylacetamide, acetone, diacetone alcohol, tetrahydrofuran, dioxane, ethylene glycol, propylene glycol, butylene glycol, pentylene glycol, hexylene glycol, diethylene glycol, thiodiglycol, polyethylene glycol, polypropylene glycol, glycerol, 1,2,6-hexanetriol, 2-methoxyethanol, 2-(2-methoxyethoxy)ethanol, 2-(2-ethoxyethoxy)ethanol, 2-(2-butoxyethoxy)ethanol, 3-butoxypropan-1-ol, 2-[2-(2-methoxyethoxy)-ethoxy]ethanol, 2-[2-(2-ethoxyethoxy)ethoxy]-ethanol, optionally substituted pyrrolidones, sulpholane and mixtures containing two or more of the aforementioned water-miscible organic solvents. Preferred water-miscible organic solvents are tetrahydrofuran, dioxane, ethylene glycol, propylene glycol, butylene glycol, pentylene glycol, hexylene glycol, optionally substituted pyrrolidones, and sulpholane.

Suitable water-immiscible organic solvents include toluene, xylene, naphthalene, tetrahydronaphthalene, methyl naphthalene, chlorobenzene, fluorobenzene, chloronaphthalene, bromonaphthalene, butyl acetate, ethyl acetate, methyl benzoate, ethyl benzoate, benzyl benzoate, butyl benzoate, phenylethyl acetate, butyl lactate, benzyl lactate, diethyleneglycol dipropionate, dimethyl phthalate, diethyl phthalate, dibutyl phthalate, di(2-ethylhexyl) phthalate, hexanol, octanol, benzyl alcohol, phenyl ethanol, phenoxy ethanol, phenoxy propanol, phenoxy butanol, anisole, phenetole, nitrocellulose, cellulose ether, cellulose acetate, low odour petroleum distillates, turpentine, white spirits, naphtha, isopropylbiphenyl, terpene, vegetable oil, mineral oil, essential oil, natural oil, $C_8$–$C_{12}$ substituted pyrrolidones and mixtures of any two or more thereof. Benzyl alcohol is especially preferred.

The weight ratio of water-miscible organic solvent to water-immiscible organic solvent in the composition is preferably 19:1 to 1:1, more preferably 8:1 to 1:1, especially 5:1 to 1:1.

The compositions according to the present invention may be prepared by combining components (a), (b), (c) and (d) in any order. Suitable combining techniques are well known in the art, for example agitation, grinding, milling, ultra-sonication or stirring of all the components. Preferably the composition is prepared by mixing components (a), (b), and (d) and optionally further components until the composition is homogenous. The mixture may then be added slowly with stirring to component (c) before adjusting the pH by addition of a base. Components (a), (b), (c) and (d) are preferably combined together under conditions which retain stability and avoid flocculation. The preferred pH range of the composition is of from 7 to 11, more preferably of from 9 to 10.

Preferably the composition comprises:
(i) from 0.1 to 10 parts, more preferably 1 to 5 parts, especially 2 to 4 parts of component (a);
(ii) from 0.1 to 10 parts, more preferably 1 to 10 parts, especially 2 to 9 parts, more especially 4 to 7 parts, of component (b);
(iii) from 0.1 to 15 parts, more preferably 2 to 10 parts, especially 4 to 8 parts of component (c); and
(iv) from 75 to 98 parts, more preferably 75 to 90 parts, especially 80 to 90 parts of component (d);
wherein all the parts are by weight and the parts by weight of (i)+(ii)+(iii)+(iv) add up to 100.

In addition to components (a), (b), (c) and (d), the composition optionally contains other components, such as a biocide, for example Proxel GXL (Proxel is a trade mark of Avecla Limited) or Kathon (Kathon is a trade mark of Rohm and Haas), a fungicide, a rheological agent, e.g. a wax (e.g. beeswax), a clay (e.g. bentonite), an IR absorber, or a fluorescent brightener, for example C.I.Fluorescent Brightener 179 and/or UV absorber, for example hydroxy phenyl-benzotriazole. Furthermore the compositions optionally contain a surface active agent, wetting agent and/or an emulsifier, for example those described in McCutcheon's Emulsifiers and Detergents 1996 International Edition or in Surfactants Europa 3$^{rd}$ Edition 1996 each of which is incorporated herein by reference.

The viscosity of the composition is preferably less than 100 cp, more preferably less than 50 cp, especially less than 20 cp, more especially less than 15 cp and most preferably less than 10 cp at 20° C.

Preferably the composition has been filtered through a filter having a mean pore size below 10 μm, preferably below 5 μm, more preferably below 2 μm, especially below 0.45 μm. In this way particulate matter is removed which could otherwise block fine nozzles in an ink-jet printer.

The composition preferably has a total concentration of divalent and trivalent metal ions below 5000, more preferably below 1000, especially below 100, more especially below 20 parts per million by weight relative to the total weight of the composition.

Pure compositions of this type may be prepared by using high purity ingredients and/or by purifying the composition after it has been prepared.

Suitable purification techniques are well known, for example ultrafiltration, reverse osmosis, ion exchange and combinations thereof.

In an embodiment of the present invention there is provided a composition comprising the components:

(a) a hydrophilic polymer having a number average molecular weight less than 30,000;

(b) a hydrophobic polymer having a number average molecular weight more than 40,000;

(c) pigment; and (d) liquid medium, wherein i) the composition has a viscosity less than 100 cp at 20° C.;

ii) the composition has been filtered through a filter having a mean pore size below 10 μm; and iii) the composition has a total concentration of divalent and trivalent metal ions below 5000 parts per million by weight relative to the total weight of the composition.

Preferably the composition is an ink, more preferably an ink suitable for use in an ink-jet printer.

The compositions according the invention have the advantage that they are suitable not only for the use in piezoelectric ink-jet printers but also in thermal and continuous ink-jet printers. Such compositions form discrete droplets on the substrate with little tendency for diffusing. Consequently sharp images with excellent print quality and little if any bleed between colours printed side by side can be obtained. Furthermore the compositions show good storage stability, wet and light fastness and fastness to both acidic and alkaline highlighter pens.

A third aspect of the invention provides a process for printing an image on a substrate comprising applying thereto a composition comprising the components (a) a hydrophilic polymer having a number average molecular weight less than 30,000;

(b) a hydrophobic polymer having a number average molecular weight more than 40,000;

(c) pigment; and (d) liquid medium.

by means of an ink-jet printer.

The ink-et printer preferably applies the composition to the substrate in the form of droplets which are ejected through a small nozzle onto the substrate. Preferred ink-jet printers are piezoelectric ink-jet printers and thermal ink-jet printers. In thermal ink-jet printers, programmed pulses of heat are applied to the compositions in a reservoir by means of a resistor adjacent to the nozzle, thereby causing the compositions to be ejected in the form of small droplets directed towards the substrate during relative movement between the substrate and the nozzle. In piezoelectric ink-jet printers the oscillation of a small crystal causes ejection of the compositions from the nozzle.

The substrate is preferably a paper, plastic, or textile material, more preferably a paper, an overhead projector slide or a textile material, especially paper.

Preferred papers are plain, coated or treated papers which may have an acid, alkaline or neutral character. Most preferably the substrate is a coated paper.

According to a further feature of the invention there is provided an ink-jet printer cartridge, optionally refillable, containing a composition as hereinbefore defined.

The invention will now be described by example only. All parts and percentages are by weight unless specified otherwise. CI refers to pigments as mentioned in the Colour Index International Third Edition (1982).

Preparation of Polymer Composition 1

Polymer Composition 1 comprises component 1(a) and component 1(b) where component 1(b) is prepared by an in-situ emulsion polymerisation in the presence of component 1(a) where the ratio of component 1(a) to component 1(b) is 35:65 w/w.

Stage 1—Preparation of component 1(a)

Component 1(a) is a hydrophilic acrylic copolymer of Mn less than 30,000, with a composition of MAA/MMA/BA (10/69.5/20.5), prepared by an emulsion polymerisation using material as listed below in Table 1:

TABLE 1

|  | Materials | Weight (g) | Percentage |
| --- | --- | --- | --- |
|  | De-ionised Water | 436.5 | 32.82 |
| monomer | Methyl methacrylate | 25.9 | 1.9 |
| shot | Butyl acrylate | 7.6 | 0.6 |
|  | 3 Mercaptoproprionic acid | 1.1 | 0.08 |
| monomer | Methacrylic acid (MAA) | 37.4 | 2.8 |
| feed | Methyl methacrylate (MMA) | 233.7 | 17.6 |
|  | Butyl acrylate (BA) | 68.8 | 5.2 |
|  | 3-Mercaptoproprionic acid | 10.0 | 0.7 |
| initiator shot | Ammonium persulphate | 0.4 | 0.03 |
|  | De-ionised water | 12.0 | 0.9 |
|  | Sodium lauryl sulphate | 0.6 | 0.04 |
| initiator feed | Ammonium persulphate | 3.3 | 0.25 |
|  | De-ionised water | 108.5 | 8.16 |
|  | Sodium lauryl sulphate | 5.0 | 0.4 |
| burn-up | Ascorbic acid | 2.24 | 0.17 |
| co-initiator | De-ionised water | 42.58 | 3.20 |
| burn-up | t-Butyl hydrogen peroxide | 3.20 | 0.24 |
| initiator | De-ionised water | 41.62 | 3.13 |
| odour | Hydrogen peroxide solution 30% | 2.49 | 0.19 |
| reducer | De-ionised water to take up to 30% solids | 2.50 | 18.50 |
| neutralisation | Ammonia solution 20% | 36.91 | 2.78 |

Water was added to a reactor and heated to 80° C. with continuous stirring. The reactor was purged with N$_2$.

The monomer shot was added to the reactor arid stirred for 5 minutes. The initiator shot was added to seed the reaction and stirred for 15 minutes. Monomer and initiator feeds were then added over 90 minutes whilst maintaining the temperature at 80–83° C. for a further hour.

Subsequently the emulsion was cooled to 50° C. to commence burn-up by adding the burn-up co-initiator dropwise over 30 minutes. The burn-up initiator was added in 3 equal shots at 1, 10 and 20 minutes of the burn-up co-initiator addition.

The mixture was stirred for 30 minutes before adding the hydrogen peroxide solution dropwise over 10 minutes.

De-ionised water was added to take the emulsion to 30% solids w/w and the temperature increased to 60° C.

The emulsion was then neutralised with ammonia solution and stirred until the solution had gone clear. The resultant hydrophilic polymer was cooled and filtered through a 50 µm mesh.

Analysis

The resultant hydrophilic polymer solution (component 1(a)) had a pH of 7.0, a weight average molecular weight (Mw) of 13289 and an Mn of 5,446. The Tg average was 66° C.

Stage 2—Preparation of Component 1(b)

Component 1(b) is a hydrophobic acrylic homopolymer of Mn more than 40,000, comprising styrene. Preparation of component 1(b) is carried out by an in-situ emulsion polymerisation of the materials as listed in Table 2 below, in the presence of component 1(a) as prepared in stage 1 above.

TABLE 2

| | Materials | Weight (g) | Percentage |
|---|---|---|---|
| initial charge | Product from stage 1. | 386.68 | 34.40 |
| | De-ionised water | 379.77 | 33.79 |
| | Ammonia solution 35% | 10.0 | 0.89 |
| emulsified feed | Styrene (STY) | 217.74 | 19.37 |
| | De-ionised water | 108.88 | 9.69 |
| | Ammonium persulphate | 1.09 | 0.1 |
| | Sodium lauryl sulphate | 1.09 | 0.1 |
| | De-ionised water for rinse | 18.75 | 1.69 |

The initial charge was added to a reactor with enough ammonia solution to ensure that the pH of the initial charge was greater than 8.5, and heated to 80–85° C. with continuous stirring under nitrogen.

10% of the emulsified feed was added to the reactor from a dropping funnel and left to nucleate for about 5 minutes. After nucleation the remainder of the emulsified feed was added over an hour while the temperature of 85±2° C. was maintained. Once all the feed was added the dropping funnel was rinsed with de-ionised water which was subsequently added to the reactor. The reaction was left for a further 30 minutes at 85° C. before cooling the resultant composition to room temperature and filtering the composition through a 50 µm mesh.

The resultant Polymer Composition 1 was made up to 30% solids w/w with deionised water, had a pH of 8.8, a particle size of 38 nm and the Mn of component 1(b) was 214,000.

Preparation of Polymer Composition 2

Polymer Composition 2 comprises a blend of component 2(a) with component 2(b) where the ratio of component 2(a) to component 2(b) is 42:58.

Stage 1—Preparation of Component 2(a)

Component 2(a) is a hydrophilic acrylic copolymer of Mn less than 30,000, with a composition of MAA/MMA (10/90) prepared by an emulsion polymerisation. The method described above for the preparation of polymer composition 1, stage 1 was repeated except that the monomer shot and monomer feed were as described in Table 3 below.

TABLE 3

| | Materials | weight (g) |
|---|---|---|
| monomer shot | methyl methacrylate | 33.7 |
| | 3-mercaptopropionic acid | 1.1 |

TABLE 3-continued

| | Materials | weight (g) |
|---|---|---|
| monomer feed | methacrylic acid | 37.4 |
| | methyl methacrylate | 302.9 |
| | 3-mercaptopropionic acid | 10.0 |

Analysis

The resultant hydrophilic polymer solution had a solids content of 30% solids w/w, a pH of 7.0 and a Mn of 5541.

Stage 2—Preparation of Component 2(b)

Component 2(b) is a hydrophobic acrylic copolymer of Mn more than 40,000, with a composition of SY/AA (96/4) prepared by an emulsion polymerisation, with materials as listed in Table 4 below.

TABLE 4

| | Materials | Weight (g) | Percentage |
|---|---|---|---|
| | De-ionised water | 442.2 | 33.95 |
| monomer shot | Styrene | 48 | 3.7 |
| | Acrylic acid | 2 | 0.15 |
| monomer feed | Styrene | 432 | 33.2 |
| | Acrylic acid | 18 | 1.4 |
| initiator shot | Ammonium persulphate | 0.25 | 0.02 |
| | Sodium lauryl sulphate | 1.0 | 0.08 |
| | De-ionised water | 13.1 | 1.0 |
| initiator feed | Ammonium persulphate | 2.25 | 0.17 |
| | Sodium lauryl sulphate | 9.0 | 0.7 |
| | De-ionised water | 117.8 | 9.0 |
| burn-up co-initiator | Ascorbic acid | 1.5 | 0.12 |
| | De-ionised water | 28.5 | 2.19 |
| burn-up initiator | t-Butyl hydrogen peroxide | 2.14 | 0.16 |
| | De-ionised water | 27.86 | 2.14 |
| neutralisation | De-ionised water | 143.37 | 11.01 |
| | Ammonia solution 35% | 13.5 | 1.04 |

Water was added to a reactor and heated to 80° C. with continuous stirring. The reactor was purged with $N_2$.

The monomer shot was added to the reactor and stirred for 5 minutes. The initiator shot was added to seed the reaction and stirred for 15 minutes. Monomer and initiator feeds were then added over 90 minutes whilst maintaining the temperature at 80–83° C. for a further hour.

Subsequently the emulsion was cooled to 50° C. to commence burn-up by adding the burn-up co-initiator dropwise over 30 minutes. The burn-up initiator was added in 3 equal shots at 1, 10 and 20 minutes of the burn-up co-initiator addition.

The mixture was stirred for 30 minutes before adding the hydrogen peroxide solution dropwise over 10 minutes. De-ionised water was added to take the emulsion to 30% solids w/w and the temperature increased to 60° C.

The emulsion was then neutralised with ammonia solution and stirred until the mixture had gone clear. The resultant hydrophobic polymer emulsion was cooled and filtered through a 50 µm mesh.

Analysis

The resultant hydrophobic polymer emulsion, component 2(b), had a pH of 9.6, an average particle size of 94 nm, and an Mn of 80,195.

Stage 3—Preparation of a Blend of Components 2(a) and 2(b)

Component 2(a) from stage 1 (28g) was added to component 2(b) from stage 2 (39 g), mixed thoroughly and de-ionised water was added to take the emulsion to 30% solids w/w to give Polymer Composition 2.

Preparation of Polymer Compositions 3, 4 & 5

Polymer Compositions 3, 4 & 5 comprise blends of component 3(a) with component 3(b) where for:

Polymer Composition 3 the ratio of component 3(a) to component 3(b) is 90:10, for Polymer Composition 4 the ratio of component 3(a) to component 3(b) is 80:20, and for Polymer Composition 5 the ratio of component 3(a) to component 3(b) is 70:30.

Polymer Composition 5 the ratio of component 3(a) to component 3(b) is 25:70.

Stage 1—Preparation of Component 3(a)

Component 3(a) is a hydrophilic polyurethane polymer of Mn less than 30,000 with materials as listed below in Table 5.

TABLE 5

| | Materials | | Weight (g) |
|---|---|---|---|
| 1. | Dimethylol propionic acid | (DMPA) | 6 |
| 2. | 1,4-Cyclohexane dimethanol | (CHDM) | 5.25 |
| 3. | Polypropylene glycol 1000 | (PPG) | 27.5 |
| 4. | Isophorone diisocyanate | (IPDI) | 36.2 |
| 5. | Dibutyl tin dilaurate | (DBTOL) | 0.08 |
| 6. | N-methyl-2-pyrrolidinone | (NMP) | 18.7 |
| 7. | Jeffamine M1000 | | 112 |
| 8. | Ammonia (35% solution) | | 1.4 |
| 9. | De-ionised water | | 546 |

Procedure

Materials 1, 2, 3, and 4 were added to a reactor and stirred under $N_2$. Material 5 was added to the reactor and heated to 50° C. with continuous stirring under $N_2$. Dibutyl tin dilaurate was added to the reactor and heated to 90° C. for three hours before removing a sample for isocyanate content determination. This was repeated until the isocyanate content (NCO) had reached 4.66%, after which Jeffamine M1000 is added to the reactor and stirred for one hour at 90° C. The reaction mixture is dispersed into a mixture of ammonia (35%) and de-ionised water and stirred for one hour at room temperature, before filtering the dispersion through a 50 µm mesh. Further de-ionised water was added to take the emulsion to 10% solids w/w.

Analysis

The resultant hydrophilic polymer emulsion, component 3(a) had a pH of 8.8, a weight average molecular weight of 7189, an Mn of 4621 and a viscosity at 10% solids w/w of 2.56 cps.

Stage 2—Component 3(b)

Component 3(b) is a commercially available polyurethane dispersion R985 NeoRez, available from NeoResins, Avecia b.v. with a Mn >50,000, which was combined with de-ionised water to take the dispersion to 10% solids w/w. (NeoRez and NeoResins are trade marks of Avecia B.V).

Stage 3—Preparation of Blends of Components 3(a) and 3(b)

Component 3(a) from stage 1 and component 3(b) from stage 2 were mixed thoroughly to give three blends, each having a solids content of 10% solids w/w. The quantifies of components 3(a) and 3(b) used for each blend are listed below in Table 6.

TABLE 6

| Polymer Composition | component 3(a) weight (g) | component 3(b) weight (g) | ratio (a):(b) |
|---|---|---|---|
| 3 | 90 | 10 | 90:10 |
| 4 | 80 | 20 | 80:20 |
| 5 | 70 | 30 | 70:30 |
| 6 | 25 | 75 | 25:75 |

Preparation of Inks

EXAMPLES 1 AND EXAMPLE 2

The materials listed below in Table 7 where mixed until homogeneous, and then the pH was adjusted to approximately 9.5 by the addition of 35% ammonia solution. To remove any particulate matter, the resultant emulsion was subsequently filtered through a 0.10 µm mesh.

Comparative Examples 1, 2 and 3

Comparative Examples 1, 2 and 3 were prepared as described above for Example 1, where Comparative Example 1 contains no components (a) or (b), Comparative Example 2 only contains component 2(a) and Comparative Example 3 only contains component 2(b).

TABLE 7

| | Examples | | Comparative Examples | | |
|---|---|---|---|---|---|
| Materials (%) | 1 | 2 | 1 | 2 | 3 |
| Cabojet 300[x] | 26 | 26 | 26 | 26 | 26 |
| Diethylene glycol | 10 | 10 | 10 | 10 | 10 |
| Urea | 5 | 5 | 5 | 5 | 5 |
| Butyl Digol | 2 | 2 | 2 | 2 | 2 |
| Surfynol 465 | 0.1 | 0.1 | 0.1 | 0.1 | 0.1 |
| Polymer Composition 1 components 1(a) and 1(b) | 33.3 | — | — | — | — |
| Polymer Composition 2 components 2(a) and 2(b) | — | 33.2 | — | — | — |
| component 2(a) only | — | — | — | 33.3 | — |
| component 2(b) only | — | — | — | — | 33.3 |
| De-ionised water | 23.6 | 23.6 | 23.6 | 23.6 | 23.6 |

[x]= Cabojet 300 is at 15.3% solids w/w in de-ionised water

EXAMPLES 3,4, 5 AND 6

The materials listed below in Table 8 where mixed until homogeneous, and then the pH was adjusted to approximately 9.5 by the addition of 2-amino-2-methyl propanol. To remove any particulate matter, the resultant emulsion was subsequently filtered through a 0.45 µm mesh.

Comparative Examples 4 and 5

Comparative Examples 4 and 5 were prepared as described above for Example 3, where Comparative Example 4 only contains component 3(a) and Comparative Example 5 only contains component 3(b).

TABLE 8

| | Examples | | | | Comparative Examples | |
|---|---|---|---|---|---|---|
| Materials (%) | 3 | 4 | 5 | 6 | 4 | 5 |
| Cabot Carbon IJX157B | 4.5 | 4.5 | 4.5 | 4.5 | 4.5 | 4.5 |
| Polymer Composition 3 (3(a):3(b) = 90:10) | 9.0 | — | — | — | — | — |
| Polymer Composition 4 (3(a):3(b) = 80:20) | — | 9.0 | — | — | — | — |
| Polymer Composition 5 (3(a):3(b) = 70:30) | — | — | 9.0 | — | — | — |
| Polymer Composition 6 (3(a):3(b) = 25:75) | — | — | — | 9.0 | — | — |
| Component 3(a) | — | — | — | — | 9.0 | — |
| Component 3(b) | — | — | — | — | — | 9.0 |
| Diethylene glycol | 10 | 10 | 10 | 10 | 10 | 10 |
| Pentanediol | 5.0 | 5.0 | 5.0 | 5.0 | 5.0 | 5.0 |
| Proxel GXL (biocide-Avecia Ltd) | 0.1 | 0.1 | 0.1 | 0.1 | 0.1 | 0.1 |
| Surfynol 465 (surfactant-Air Products) | 0.2 | 0.2 | 0.2 | 0.2 | 0.2 | 0.2 |
| De-ionised water | 71.2 | 71.2 | 71.2 | 71.2 | 71.2 | 71.2 |

Evaluation of the Inks Prepared in Examples 1 to 6 and Comparative Examples 1 to 5

The inks prepared in Examples 1 and 2, and Comparative Examples 1, 2 and 3 were evaluated for stability and were fired from an Epson 600 piezo ink-jet printer onto Conqueror High White Wove 100 g/m² plain paper from Arjo Wiggins Ltd.

The inks prepared in Examples 3, 4, 5 and 6 and Comparative Examples 4 and 5 were evaluated for stability and were fired from a Hewlet Packard HP690C thermal ink-jet printer onto Xerox 4024 DP paper. The resultant prints were evaluated for highlighter smear resistance, print quality and wet rubfastness. The evaluation test results are shown below in Table 9.

The higher the value, the stronger the print is. Optical density is measured using an X-Rite 938 Spectrodensitometer.

Print Quality

The print quality is a subjective microscopic evaluation of the print edge quality and the uniformity of dot spread where a non-uniform dot spread includes wicking and feathering.

Preparation of Pigment Millbases for Use in Examples 7, 8 and 9

Pigment millbases were prepared by milling the materials as shown below in Table 10.

TABLE 9

| | | Ink stability data | | | | Printed ink performance | | | |
|---|---|---|---|---|---|---|---|---|---|
| Example | Polymer | RT | 60° C. | 70° C. | TC | Wet rub fastness | Highlighter smear | Print Quality | OD |
| 1 | Polymer Composition 1 Components 1(a) and 1(b) [35:65] | 5 | 5 | 2 | 5 | very little smear | no smear 100% | good | — |
| 2 | Polymer Composition 2 Components 2(a) and 2(b) [42:58] | 5 | 5 | 5 | 5 | very little smear | no smear 100% | good | — |
| 3 | Polymer Composition 3 Components 3(a) and 3(b) [50:10] | 5 | — | — | — | little smear | little smear | good | — |
| 4 | Polymer Composition 4 Component (3a) and 3(b) [80:20] | 5 | — | — | — | very little smear | very little smear | good | — |
| 5 | Polymer Composition 5 Components 3(a) and 3(b) [70:30] | 5 | — | — | — | no smear | no smear | good | — |
| 6 | Polymer Composition 6 Components 3(a) and (3b) [25:75] | 5 | — | — | 4 (8 weeks) | little smear | very little smear | good | 0.97 |
| CE 1 | No polymers | 5 | 5 | 5 | 5 | smeared | smeared | very poor | — |
| CE 2 | Component 2 (a) only | 1 | 1 | 1 | 1 | did not print | did not print | did not print | — |
| CE 3 | Component 2 (b) only | 5 | 5 | 5 | 5 | dld not print | did not print | did not print | — |
| CE 4 | Component 3 (a) only | 5 | — | — | — | smeared | smeared | good | 0.92 |
| CE 5 | Component 3 (b) only | 5 | — | — | — | did not print | did not print | very poor | — |

KEY:-
— = Not measured
CE = Comparative example
RT = room temperature
TC = Temperature cycle
OD = Optical density Highlighter Smear Resistance This is a test performed 5 minutes after printing.

A yellow highlighter pen was used to draw a horizontal line across a series of printed vertical bars. The amount of ink smear between the vertical bars was assessed visually against controls.

Wet Rubfastness

This is a test performed 5 minutes after printing.

A finger was wetted and rubbed on the corner of a printed solid black block. The amount of ink transferred to white paper is assessed visually against controls.

Ink Stability

The ink resulting from stage 1 were stored in an incubator at a range of temperatures for one week or eight weeks, as stated with the results. The temperature cycle was a 24 hour cycle (−10° C. to 25° C.).

The stability was evaluated by optical microscopy and the stability was ranked as follows:

| Rank | Description |
|---|---|
| 5 | No change, good mobile dispersion |
| 4 | Good, a few 1 micron particles present, still mobile |
| 3 | An increase in the amount of particles greater than 1 micron |
| 2 | Large (greater than 2 micron) flocculates present, ink less mobile |
| 1 | Flocculated, immobile, unstable |

Optical Density

The optical density is a measure of the colour strength of a printed image and is expressed as a number without units.

TABLE 10

| | Pigment Millbase | | |
|---|---|---|---|
| Materials (parts by weight) | 1 | 2 | 3 |
| CI Pigment Yellow 12 | 20 | — | — |
| CI Pigment Yellow 74 | — | 20 | — |
| CI Pigment Blue 15-3 | — | — | 20 |
| De-ionised water | 71.5 | 71.5 | 69.5 |
| Triazine dispersant S174992 (Avecia Ltd) | 3 | 3 | 5 |
| Surfynol CT111 Anti-foam (Air Products) | 6 | 5 | 6 |
| Solsperse 2700 Anti-foam | 0.5 | 0.5 | 0.5 |

Preparation of Inks

EXAMPLES 7, 8 AND 9

The materials listed below in Table 11 where mixed until homogeneous, and then the pH was adjusted to approximately 9.5 by the addition of 2-amino-2-methyl propanol. To remove any particulate matter, the resultant emulsion was subsequently filtered through a 0.45 μm mesh.

Comparative Examples 6, 7 and 8

Comparative Examples 6, 7 and 8 were prepared as described above for Example 6 except that they did contain any of Polymer Composition 1.

TABLE 11

| Materials (parts by weight) | Examples 7 | Examples 8 | Examples 9 | Comparative Examples 6 | Comparative Examples 7 | Comparative Examples 8 |
|---|---|---|---|---|---|---|
| Polymer Composition 1 | 6 | 6 | 6 | — | — | — |
| Pigment Millbase 1* | 20 | — | — | 20 | — | — |
| Pigment Millbase 2* | — | 20 | — | — | 20 | — |
| Pigment Millbase 3* | — | — | 20 | — | — | 20 |
| Diethylene glycol | 10 | 10 | 10 | 10 | 10 | 10 |
| Pentane diol | — | — | — | 5 | 5 | 5 |
| Urea | 5 | 5 | 5 | — | — | — |
| Butyldigol | 2 | 2 | 2 | — | — | — |
| Surfynol 465 | 0.1 | 0.1 | 0.1 | — | — | — |
| De-ionised water | 72.9 | 72.9 | 72.9 | 81 | 81 | 81 |

*= equivalent to 4 parts by weight of pigment

Evaluation of the Inks Prepared in Examples 7, 8 and 9 and Comparative Examples 6, 7 and 8

The inks prepared in Examples 7, 8 and 9 and Comparative Examples 6, 7 and 8 were fired from an Epson 660 piezo ink-jet printer onto Seiko Epson (SEC) glossy film, glossy paper and coated paper. The resultant prints were evaluated for light-fastness by measurement of the ΔE after 100 hours in an Atlas Weatherometer. The evaluation test results are shown below in Table 12. The lower the value of ΔE, the better the light fastness.

TABLE 12

| | Lightfastness ΔE after 100 hours | | |
|---|---|---|---|
| | SEC glossy film | SEC glossy paper | SEC coated paper |
| Example 7 | 20.79 | — | — |
| Comparative Example 8 | 66.85 | — | — |
| Example 8 | 1.19 | 1.05 | 0.69 |
| Comparative Example 7 | 3.19 | 1.95 | 2.95 |
| Example 9 | 2.99 | 2.99 | — |
| Comparative Example 8 | 7.39 | 7.39 | — |

— = not measured

From Table 12 it can be seen that Examples 6, 7 and 8 which contain Polymer Composition 1 have significantly better light-fastness than Comparative Examples 6, 7 and 8.

Preparation of Polymer Compositions 7, 8 and 9

Polymer Compositions 7, 8 and 9 comprise components (a) and (b) where component (b) is prepared by an in-situ emulsion polymerisation in the presence of component (a) where the ratio of component (a) to component (b) is 35:35 w/w.

Polymer Composition 7=component 1(a) and component 4(b)

Polymer Composition 8=component 1 (a) and component 5(b)

Polymer Composition 9=component 1 (a) and component 6(b)

Components 4(b), 5(b) and 6(b) are hydrophobic acrylic polymers prepared by an in-situ emulsion polymerisation in the presence of component 1(a) using the method described for the preparation of component 1(b) in the presence of component 1(a) and the monomers used for components 4(b), 5(b) and 6(b) are as listed below in Table 13.

TABLE 13

| | Monomers w/w | | | | |
|---|---|---|---|---|---|
| | Styrene | 2-hydroxyethyl acrylate | Mn | Mw | Calculated Tg ° C. |
| Component 4(b) | 100 | 0 | 303996 | 763892 | 100 |
| Component 5(b) | 67 | 33 | 356847 | 976458 | 32 |
| Component 6(b) | 31 | 69 | 316677 | 1022088 | −19 |

Preparation of Inks

EXAMPLES 10, 11 AND 12

The inks were prepared and fired as described for Example 3 above and the evaluation test results are shown below in Table 14.

TABLE 14

| | | Ink Stability Data | | | | |
|---|---|---|---|---|---|---|
| Example | Polymer | room temperature | 70° C. 1 week | OD | Print Quality | Wet rub fastness |
| 10 | Polymer composition 7 Components 1(a) and 4(b) | 5 | 4 | 1.09 | very good | very good |
| 11 | Polymer composition 8 Components 1(a) and 5(b) | 5 | 4 | 1 | good | very good |
| 12 | Polymer composition 9 Components 1(a) and 6(b) | 5 | 4 | 1.03 | adequate | very good |

From Table 14 it can be seen that examples 10 and 11 in which components 4(b) and (5b) respectively have a Tg above 2° C. have a better print quality than Example 12, although all three examples show a very good wet rub fastness.

Preparation of Polymer Compositions 10 to 16

Polymer compositions 10 to 16 comprise blends of components (a) with component (b) where the ratio of component (a) to component (b) is 25:75 w/w.

Polymer Composition 10=component 4(a) and component 3(b)

Polymer Composition 11=component 4(a) and component 7(b)

Polymer Composition 12=component 5(a) and component 3(b)

Polymer Composition 13=component 5(a) and component 7(b)

Polymer Composition 14=component 1(a) and component 8(b)

Polymer Composition 15=component 4(a) and component 2(b)

Components 4(a) and 5(a) are hydrophilic polyurethane polymers prepared using the method described above for component 3(b) with materials and analysis results as listed below in Table 15.

TABLE 15

| Materials | Component 4(a) Weight (g) | Component 5(a) Weight (g) |
|---|---|---|
| 1. DMPA | 3.0 | 0 |
| 2. CHDM | 8.25 | 11.25 |
| 3. PPG 1000 | 27.9 | 28.3 |
| 4. IPDI | 35.8 | 35.45 |
| 5. DBTDL | 0.08 | 0.08 |
| 6. NMP | 19 | 19 |
| 7. Jeffamine M 1000 | 115.26 | 108.41 |
| 8. Ammonia 35% sol | 1.4 | 0 |
| 9. De-ionised Water | 546 | 528 |
| Analysis | | |
| Solids content | 24.1% | 23.9% |
| Mn | 4343 | 4986 |
| Mw | 6676 | 7529 |
| Viscosity at 10% solids (spindle 0 at 60 rpm) | 2.47 | 2.35 |

Components 7(b) and 8(b) are commercially available dispersions from NeoResins, Avecia BV.

Component 7(b) is NeoRez R2001, an aliphatic modified polyurethane dispersion, with a Mn >50,000. Component 8(b) is NeoRez 970, an aliphatic polyether polyurethane dispersion with a Mn >50,000. Each component 7(b) and 8(b) was combined with deionised water to take the dispersion to 10% solids w/w. (NeoRez and NeoResins are trade marks of Avecia BV).

Preparation of Inks

Examples 13 to 18 and Comparative Examples 9 to 12.

Inks were prepared, evaluated for stability and fired as described for Example 3 and Comparative Example 4 above and the evaluation test results are shown below in Table 16.

What is claimed is:

1. An ink composition comprising:
   (a) a hydrophilic polymer having a number average molecular weight less than 30,000;
   (b) a hydrophobic polymer having a number average molecular weight more than 40,000;
   (c) carbon black pigment carrying water-dispersible groups; and
   (d) liquid medium,
   said composition having a viscosity of less than 20 cp at 20° C., wherein the hydrophobic polymer comprises a mixture of a hydrophobic acrylic polymer and a hydrophobic polyurethane polymer.

2. An ink according to claim 1, wherein component (a) has a number average molecular weight less than 20,000.

3. An ink according to claim 1 wherein component (b) has a number average molecular weight greater than 60,000.

4. An ink according to claim 1 wherein component (a) is selected from the group consisting of acrylic polymers, polyurethanes and polyesters.

5. An ink according to claim 1 wherein the hydrophilic polymer is hydrophilic by virtue of the presence of ionic and/or non-ionic water dispersing groups in the hydrophilic polymer.

6. An ink according to claim 1 wherein the ink has a total concentration of divalent and trivalent metal ions below 5000 parts per million by weight relative to the total weight of the ink.

7. An ink according to claim 1 wherein the ink has been filtered through a filter having a mean pore size below 10 μm.

8. An ink according to claim 1 which comprises:
   (i) from 0.1 to 10 parts of component (a);
   (ii) from 0.1 to 10 parts of component (b);
   (iii) from 0.1 to 15 parts of component (c); and
   (iv) from 75 to 98 parts of component (d)

TABLE 16

| | Polymers | Ink Stability 8 weeks at 60° C. | Print Quality | Wet Fastness | Highlighter Smear | O.D. |
|---|---|---|---|---|---|---|
| Example | | | | | | |
| 13 | Polymer Composition 10 [Component 4(a) and 3(b)] | 4 | Good | Little Smear | No smear | 0.98 |
| 14 | Polymer Composition 11 [Component 4(a) and 7(b)] | 4 | Good | Very little smear | No smear | 0.98 |
| 15 | Polymer Composition 12 [Component 5(a) and (3b)] | 4 | Good | Very little smear | No smear | 0.98 |
| 16 | Polymer Composition 13 [Component 5(b) and 7(b)] | 4 | Good | Little Smear | No smear | 0.98 |
| 17 | Polymer Composition 14 [Component 1(a) and 8(b)] | 4 | Adequate | Little smear | No smear | 0.94 |
| 18 | Polymer Composition 15 [Component 4(a) and 2(b)] | 4 | Good | Very little smear | Little smear | 0.98 |
| Comparative Example | | | | | | |
| 9 | Component 4(a) | 4 | Good | Little smear | Little smear | 0.92 |
| 10 | Component 7(b) | 4 | Good | Very little smear | Little smear | 1.0 |
| 11 | Component 5(a) | 4 | Poor | Little smear | Some smear | 0.92 |
| 12 | Component 8(b) | 3 | Poor | Smear | No smear | 0.84 | wherein all the parts are by weight and the parts by weight of (i)+(ii)+(iii)+(iv) add up to 100.

9. An ink according to claim 1 wherein the carbon black pigment carries ionic groups.

10. A process for printing an image on a substrate comprising applying thereto an ink according to claim 1 by means of an ink-jet printer.

11. An ink-jet printer cartridge containing an ink according to claim 1.

12. An ink composition comprising:
  (a) a hydrophilic polyurethane polymer having a number average molecular weight less than 30,000;
  (b) a hydrophobic polymer having a number average molecular weight more than 40,000;
  (c) pigment; and
  (d) liquid medium,
  said composition having a viscosity of less than 20 cp at 20° C.

13. An ink according to claim 12 wherein component (a) has a number average molecular weight less than 20,000.

14. An ink according to claim 12 wherein component (b) has a number average molecular weight greater than 60,000.

15. An ink according to claim 12 wherein component (b) is independently selected from the group consisting of acrylic polymers, polyurethanes and polyesters.

16. An ink according to claim 12 wherein the hydrophobic polymer comprises a mixture of hydrophobic acrylic polymer and hydrophobic polyurethane polymer.

17. An ink according to claim 12 wherein the hydrophilic polyurethane polymer is hydrophilic by virtue of the presence of ionic and/or non-ionic water dispersing groups in the hydrophilic polyurethane polymer.

18. An ink according to claim 12 wherein the ink has a total concentration of divalent and trivalent metal ions below 5000 parts per million by weight relative to the total weight of the ink.

19. An ink according to claim 12 wherein the ink has been filtered through a filter having a mean pore size below 10 μm.

20. An ink according to claim 12 which comprises:
  (i) from 0.1 to 10 parts of component (a);
  (ii) from 0.1 to 10 parts of component (b);
  (iii) from 0.1 to 15 parts of component (c); and
  (iv) from 75 to 98 parts of component (d)
wherein all the parts are by weight and the parts by weight of (i)+(ii)+(iii)+(iv) add up to 100.

21. An ink according to claim 12 wherein the pigment is selected from yellow, red, orange, green, violet, indigo, blue and/or black organic and/or inorganic pigment.

22. An ink according to claim 12 wherein the pigment is a carbon black pigment.

23. An ink according to claim 22 wherein the carbon black pigment carries ionic groups.

24. A process for printing an image on a substrate comprising applying thereto an ink according to claim 12 by means of an ink-jet printer.

25. An ink-jet printer cartridge containing an ink according to claim 12.

* * * * *